(12) United States Patent
Kobayashi et al.

(10) Patent No.: US 9,870,402 B2
(45) Date of Patent: Jan. 16, 2018

(54) DISTRIBUTED STORAGE DEVICE, STORAGE NODE, DATA PROVIDING METHOD, AND MEDIUM

(71) Applicant: NEC CORPORATION, Tokyo (JP)

(72) Inventors: Dai Kobayashi, Tokyo (JP); Satoshi Yamakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 14/427,182

(22) PCT Filed: Sep. 27, 2013

(86) PCT No.: PCT/JP2013/076309
§ 371 (c)(1),
(2) Date: Mar. 10, 2015

(87) PCT Pub. No.: WO2014/051071
PCT Pub. Date: Apr. 3, 2014

(65) Prior Publication Data
US 2015/0347516 A1    Dec. 3, 2015

(30) Foreign Application Priority Data

Sep. 28, 2012 (JP) ................. 2012-217852

(51) Int. Cl.
*G06F 7/00* (2006.01)
*G06F 17/30* (2006.01)

(52) U.S. Cl.
CPC .. *G06F 17/30516* (2013.01); *G06F 17/30321* (2013.01); *G06F 17/30528* (2013.01);
(Continued)

(58) Field of Classification Search
CPC ......... G06F 17/30321; G06F 17/30576; G06F 17/30867; G06F 17/30528; G06F 17/30554; G06F 17/30575
See application file for complete search history.

(56) References Cited

U.S. PATENT DOCUMENTS 5,377,102 A * 12/1994 Nishiishigaki ........ G06T 3/0081
340/990
6,181,609 B1 * 1/2001 Muraoka .............. G11C 7/1051
365/189.05
(Continued)

FOREIGN PATENT DOCUMENTS

| JP | 2008-294774 A | 12/2008 |
| JP | 2011-100359 A | 5/2011 |
| JP | 2012-242845 A | 12/2012 |

OTHER PUBLICATIONS

International Search Report for PCT/JP2013/076309 dated Oct. 22, 2013.
(Continued)

*Primary Examiner* — Daniel Kuddus
(74) *Attorney, Agent, or Firm* — Sughrue Mion, PLLC

(57) ABSTRACT

A distributed storage device according to the present invention includes: a plurality of storage nodes, the plurality of storage nodes includes: a data storage unit that accumulates stream data output from a device; a first time frame generation unit that generates a time frame synchronized with another storage node and associates a data element included in stream data accumulated in the data storage unit with one of time frames; a data selection unit that selects a data element associated with a predetermined time frame from the stream data accumulated in the data storage unit, based on an access request from a client terminal; and a data transmission unit that transmits a data element selected by the data selection unit to the client terminal.

20 Claims, 9 Drawing Sheets

(52) U.S. Cl.
CPC .. *G06F 17/30554* (2013.01); *G06F 17/30575* (2013.01); *G06F 17/30867* (2013.01)

(56) References Cited

U.S. PATENT DOCUMENTS

| | | | | |
|---|---|---|---|---|
| 6,243,348 | B1* | 6/2001 | Goodberlet | B82Y 10/00 369/101 |
| 6,249,824 | B1* | 6/2001 | Henrichs | G06F 3/0616 360/99.22 |
| 6,898,791 | B1* | 5/2005 | Chandy | G06F 9/546 714/15 |
| 7,010,538 | B1* | 3/2006 | Black | G06F 17/30516 707/636 |
| 7,831,683 | B2* | 11/2010 | Becker | G06F 17/3028 709/203 |
| 8,434,110 | B2* | 4/2013 | Sharkey | H04N 5/44543 715/747 |
| 8,434,119 | B2* | 4/2013 | Oshima | H04N 7/17336 725/116 |
| 8,787,229 | B2* | 7/2014 | Sasao | H04W 88/04 370/311 |
| 8,898,791 | B2* | 11/2014 | Brando | G06F 8/61 726/23 |
| 2005/0076136 | A1* | 4/2005 | Cho | H04L 29/06027 709/231 |
| 2005/0076236 | A1* | 4/2005 | Stephenson | G06F 21/55 726/4 |
| 2005/0108365 | A1* | 5/2005 | Becker | G06F 17/3028 709/219 |
| 2010/0011402 | A1* | 1/2010 | Oshima | H04N 7/17336 725/118 |
| 2011/0292864 | A1* | 12/2011 | Sasao | H04W 88/04 370/315 |

OTHER PUBLICATIONS

K. Mani Chandy et al., "Distributed Snapshots: Determining Global States of Distributed Systems", ACM Transactions on Computer Systems (TOCS), Feb. 1985, pp. 63-75, vol. 3, Issue 1.

Alan Fekete et al., "Making Snapshot Isolation Serializable", ACM Transactions on Database Systems (TODS), Jun. 2005, pp. 492-528, vol. 30, Issue 2.

Communication dated May 2, 2016 from the European Patent Office in counterpart Application No. 13842652.3.

* cited by examiner

ID

DISTRIBUTED STORAGE DEVICE, STORAGE NODE, DATA PROVIDING METHOD, AND MEDIUM

CROSS REFERENCE TO RELATED APPLICATIONS

This application is a National Stage of International Application No. PCT/JP2013/076309 filed Sep. 27, 2013, claiming priority based on Japanese Patent Application No. 2012-217852, filed Sep. 28, 2012, the contents of all of which are incorporated herein by reference in their entirety.

DESCRIPTION OF RELATED APPLICATION

The present invention is based upon Japanese patent application No. 2012-217852 (filed on Sep. 28, 2012), the entire disclosure of the application is incorporated herein by reference.

The present invention relates to a distributed storage device, a storage node, a data providing method, and a medium, and in particular, relates to a distributed storage device, a storage node, a data providing method, and a medium that distribute and accumulate stream data and provide the accumulated stream data to analytical processing in a Cyber Physical System (CPS).

BACKGROUND ART

A data-processing system that obtains knowledge useful for business by performing breakdown or analysis of a large amount of data obtained from hour to hour (stream data) in real time is called a Cyber Physical System (CPS) or the like, and needs thereof have been increased.

As a structure of such a data-processing system, a structure in which stream data is firstly stored in a storage device (data store) and the stored data is analyzed by a separate computer is considered. By accumulating the data, a buffer memory on a sensor device side can be released faster. In addition, by accumulating the data, a plurality of computers that perform analysis can also use the data.

The storage device obtains and accumulates stream data, such as a running condition and a position of a vehicle, a position of a user of a mobile terminal, and weather data, from a sensor or a device of a vehicle, a mobile terminal, meteorological equipment and the like. Concurrently, the storage device provides the accumulated stream data for a computer that performs analysis. The computer that performs analysis carries out analytical processing on the stream data accumulated in the storage device depending on a predetermined breakdown scenario to generate a breakdown result. As an example of processing by the computer that performs analysis, there are Complex Event Processing (CEP), MapReduce processing, and the like.

For example, in a monitoring system of traffic information, stream data such as a speed of each vehicle detected by a sensor mounted on each vehicle is accumulated in a storage device. Concurrently, a future position of the vehicle is calculated by a computer that performs analysis, based on the most recent position and speed of each vehicle accumulated in the storage device. Then, presence or absence of occurrence of a traffic jam, an accident, and the like can be detected by checking a future position of each vehicle.

In consideration of scalability of a system in a case that the data volume that should be accumulated is increased, the storage device is considered to be achieved based on a distributed data store structure. FIG. 7 is a diagram illustrating a structure of a distributed storage device 140 based on the distributed data store structure as an example. Referring to FIG. 7, the distributed storage device 140 includes a plurality of storage nodes 110a to 110n connected to one another via an inter-storage network 130. Each of the storage nodes 110a to 110n includes a storage medium, and a calculator capable of being connected to the inter-storage network 130. Further, a control function of a data store can be achieved by distributed processing with the plurality of storage nodes 110a to 110n.

As a related art, a snapshot that generates a rest point image in a storage is described in NPL 1. Further, a technology for transmitting a consistent still image before an initial access (BEGIN) to a certain client in a database is described in NPL 2.

CITATION LIST

Non Patent Literature

[NPL 1] K. M. Chandy and L. Lamport, "Distributed Snapshots: Determining Global States of Distributed Systems," ACM Transactions on Computer Systems, Vol. 3, No. 1, February 1985. pp. 63-75.
[NPL 2] A. Fekete, et al., "Making Snapshot Isolation Serializable," ACM Transactions on Database Systems, Vol. 30, No. 2, June 2005, pp. 492-528.

SUMMARY OF INVENTION

Technical Problem

Full disclosure of the above-described Non Patent Literature is incorporated herein by reference. The following breakdown has been made by the present inventors.

When trying to obtain the latest synchronized data from the plurality of storage nodes (nodes) (FIG. 7) that distribute and accumulate sensor data obtained by a plurality of sensors, the following problem is caused.

Generally, stream data is stored including a unique primary key (primary key) and 1 or 2 or more metadata (metadata1, metadata2, . . . ). For example, stream data including values of two metadata, name1 and name2, in addition to a primary key, has the following structure.

{key: hogehoge, name1:value1, name2: value2}

FIG. 8 is a diagram for illustrating a problem when accessing stream data based on a primary key in a distributed storage device according to the related art.

Referring to FIG. 8, a storage node 110a accumulates stream data A transmitted from a sensor. Herein, the stream data A consists of data elements A1, A2, . . . . Similarly, storage nodes 110b, 110c, and 110d accumulate stream data B (data elements B1, B2, . . . ), stream data C (data elements C1, C2, . . . ), and stream data D (data elements D1, D2, . . . ) transmitted from sensors, respectively.

Herein, access in which the latest data elements of all sensors distributed and accumulated in the storage nodes 110a to 110d are obtained based on a primary key is considered. Herein, the access is assumed to be started at a time t1. At this time, for a client terminal that reads out a data element D8, data elements C8, B8, and A8 that are consistent with the data element D8 (that is, a time when the data is generated is sufficiently close when taking into account accuracy used in processing thereafter) are desired to be provided. However, as indicated by a dashed arrow in FIG. 8, when it takes time for the client terminal to read out all data elements, data elements D8, C10, B11, and A12 that are not consistent may be read out.

Specifically, in the case illustrated in FIG. 8, in a case of trying to obtain the data elements D8, C8, B8, and A8 immediately after the access start time t1, when an access time indicated by the dashed arrow is required, there is a problem of not obtaining desired data elements but obtaining the data elements D8, C10, B11, and A12 from the distributed storage device.

In order to solve such a problem, synchronization between the plurality of storage nodes every time data is accumulated in each storage node is considered. However, when the number of the storage nodes is increased, since a communication load between the storage nodes is large, synchronous processing becomes a bottleneck, and thus, performance of the distributed storage device may be decreased.

In the example illustrated in FIG. 8, stream data is selected based on an access request "primary key=xxx". On the other hand, when selecting stream data, data is sometimes desired to be selected based on not the primary key but a data content, such as "value=bbb of metadata of name=aaa". The stream data is distributed and accumulated in the plurality of storage nodes by, for example, a method of Distributed Hash Table (DHT) or the like, based on the primary key. At this time, when performing search (metadata search) based on the data content as described above, search of all data needs to be performed. Further, in addition to identifying the data content, a plurality of data that provide a data range are sometimes obtained. Therefore, in order to achieve high-speed data retrieval, an index server needs to be provided.

FIG. 9 is a diagram for illustrating a problem when accessing using metadata in a distributed storage device according to the related art. Referring to FIG. 9, storage nodes 110a to 110d accumulate stream data A to D transmitted from sensors, respectively. The stream data A to D include data elements A1, A2, ..., data elements B1, B2, ..., data elements C1, C2, ..., and data elements D1, D2, ..., respectively. Further, an index server 120 accumulates indexes with respect to the stream data A to C accumulated in the storage nodes 110a to 110c.

Since it takes time for the index server 120 to generate indexes, consistency between the storage nodes 110a to 110c and the index server 120 becomes a problem in the distributed storage device illustrated in FIG. 9. Specifically, in the distributed storage device illustrated in FIG. 9, when data elements A8, B8, and C8 are desired to be obtained, data elements A12, B13, and C14 may be read out due to update delay of the indexes and access delay to the storage nodes, and a problem of not obtaining desired data elements may be caused It is noted that a distributed snapshot described in the above-described NPL 1 is difficult to be applied for solving the above-described problem due to a high processing load. Further transaction processing (Snapshot Isolation and Serializable Snapshot Isolation) described in NPL 2 is similarly difficult to be realized due to a high processing load of distributed control.

Accordingly, it is required that a data element in which a time when data is generated is sufficiently close can be obtained fast from each of a plurality of storage nodes that distribute and accumulate stream data transmitted from a device. The object of the present invention is to provide a distributed storage device, a storage node, a data providing method, and a medium that contribute to such a requirement.

Solution to Problem

A distributed storage device according to a first aspect of the present invention includes:
a plurality of storage nodes,
the plurality of storage nodes includes:
a data storage unit that accumulates stream data output from a device;
a first time frame generation unit that generates a time frame synchronized with another storage node and associates a data element included in stream data accumulated in the data storage unit with one of time frames;
a data selection unit that selects a data element associated with a predetermined time frame from the stream data accumulated in the data storage unit, based on an access request from a client terminal; and
a data transmission unit that transmits a data element selected by the data selection unit to the client terminal.

A storage node according to a second aspect of the present invention, that is one of a plurality of storage nodes included in a distributed storage device, includes:
a data storage unit that accumulates stream data output from a device;
a first time frame generation unit that generates a time frame synchronized with another storage node and associates a data element included in stream data accumulated in the data storage unit with one of time frames;
a data selection unit that selects a data element associated with a predetermined time frame from the stream data accumulated in the data storage unit, based on an access request from a client terminal; and
a data transmission unit that transmits a data element selected by the data selection unit to the client terminal.

A data providing method according to a third aspect of the present invention includes:
accumulating stream data output from a device in a data storage unit by a storage node that is one of a plurality of storage nodes included in a distributed storage device;
generating a time frame synchronized with another storage node and associating a data element included in stream data accumulated in the data storage unit with one of time frames;
selecting a data element associated with a predetermined time frame from the stream data accumulated in the data storage unit, based on an access request from a client terminal; and
transmitting a selected data element to the client terminal.

A computer readable non-transitory medium according to a fourth aspect of the present invention, embodying a program, the program causing a storage node included in a distributed storage device to perform a method, the method includes:
accumulating stream data output from a device in a data storage unit;
generating a time frame synchronized with another storage node and associating a data element included in stream data accumulated in the data storage unit with one of time frames;
selecting a data element associated with a predetermined time frame from the stream data accumulated in the data storage unit, based on an access request from a client terminal; and transmitting a selected data element to the client terminal.

It is noted that the program can be provided as a program product recorded in a non-transitory computer-readable storage medium.

Advantageous Effects of Invention

According to the distributed storage device, the storage node, the data providing method, and the medium according to the present invention, a data element in which a time when data is generated is sufficiently close can be obtained fast from each of a plurality of storage nodes that distribute and accumulate stream data transmitted from a device.

DESCRIPTION OF EMBODIMENTS

Figure 1:
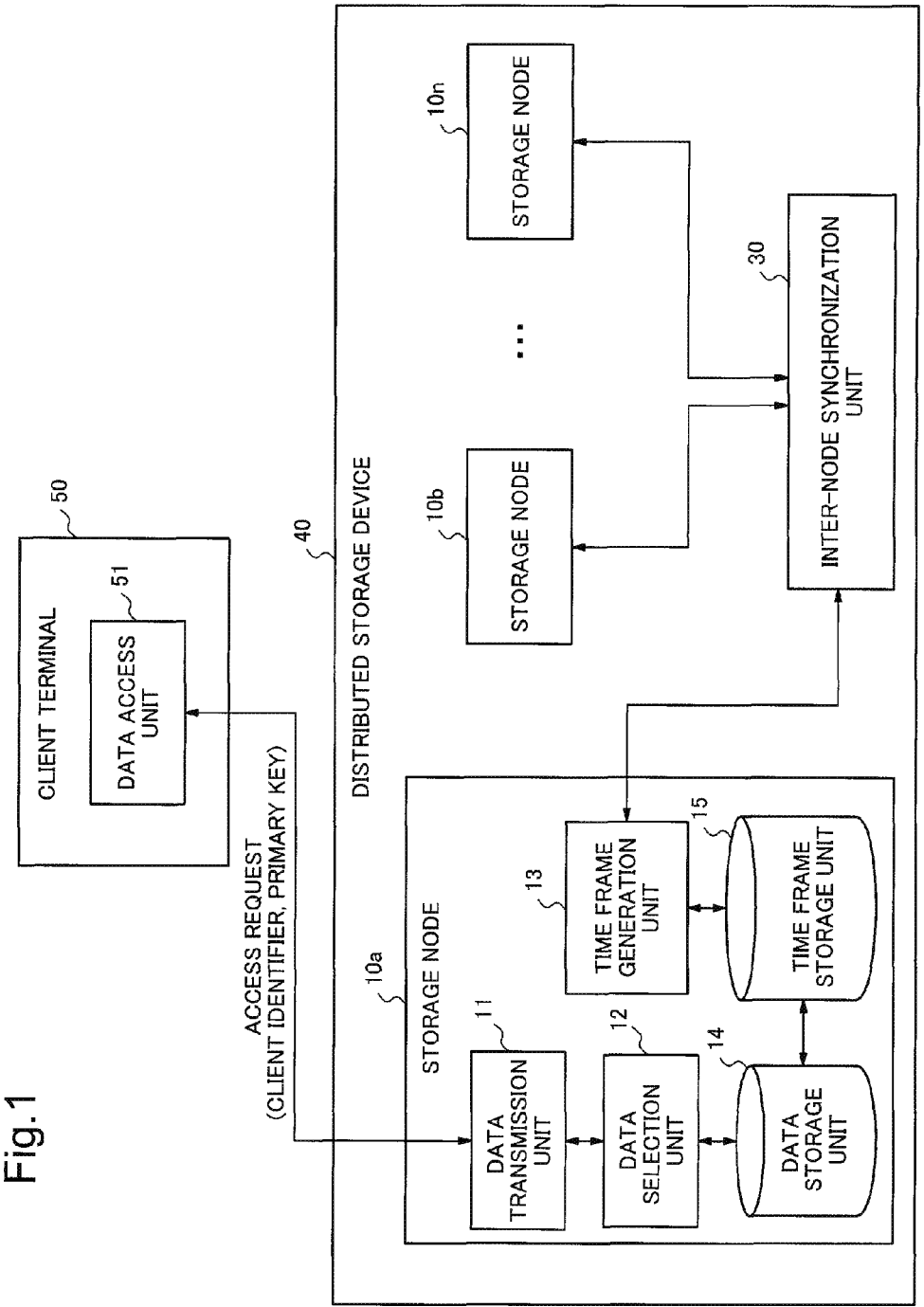
FIG. 1 a block diagram illustrating a structure of a distributed storage device according to a first exemplary embodiment as an example.

Firstly, an outline of an exemplary embodiment will be described. It is noted that drawing reference numerals used in the outline are examples only to help understanding and are not intended to limit the present invention to the illustrated aspects.

Referring to FIG. 1, a distributed storage device (40) includes a plurality of storage nodes (10a to 10n). Each of the storage nodes (10a to 10n) includes a data storage unit (14) that accumulates stream data output from a device, a time frame generation unit (13) that generates time frames synchronized with another storage node and associates each data element included in the stream data accumulated in the data storage unit (14) with one of the time frames (that is, period and time slot), a data selection unit (12) that selects a data element associated with a predetermined time frame from the stream data accumulated in the data storage unit (14), based on an access request from a client terminal (50), and a data transmission unit (11) that transmits the data element selected by the data selection unit (12) to the client terminal (50).

Herein, instead of directly receiving the stream data output from the device, the distributed storage device (40) may receive, after another computer once receives the stream data, the stream data transferred from the computer.

The client terminal (50) may be a separate computer from the storage nodes (10a to 10n) or a software instance (process, thread, fiber, and the like) that operates thereon. Further, the client terminal (50) may be a software instance that operates on another device that constitutes the storage nodes (10a to 10n) and the distributed storage device (40). Furthermore, a plurality of pieces of software that operate on one or more calculators may be virtually regarded as one client terminal (50).

The data selection unit (12) selects a data element (for example, A6 in FIG. 3) associated with a time frame (fa1) associated with a data element (A6) that is already selected, as a data element with respect to a subsequent access request from the client terminal (50). Further, a data selection unit (not depicted) of a storage node (10b) selects a data element (for example, B7 in FIG. 3) associated with a time frame (fb1 in FIG. 2) synchronized with a time frame (fa1) associated with a data element (for example, A6) selected by another storage node (for example, 10a) with respect to the access request from the client terminal (50), as a data element with respect to a subsequent access request from the client terminal (50).

According to the distributed storage device (40), synchronized data elements (for example, A6 and B7 in FIG. 3) can be obtained from each of the plurality of storage nodes (10a to 10n) that distribute and accumulate the stream data transmitted from the device.

Referring to FIG. 1, the distributed storage device (40) may include an inter-node synchronization unit (30) that generates a request for updating a time frame. The time frame generation unit (13) generates a time frame on each timing of receiving (accepting) a time frame updating request generated by the inter-node synchronization unit (30). At this time, although there may be a bit of a discrepancy as actual time, logically-synchronized time frames are generated between the storage nodes (10a to 10n). For example, in FIG. 2, sets of logically-synchronized time frames (fa1, fb1), (fa2, fb2), and (fa3, fb3) are obtained.

Figure 4:
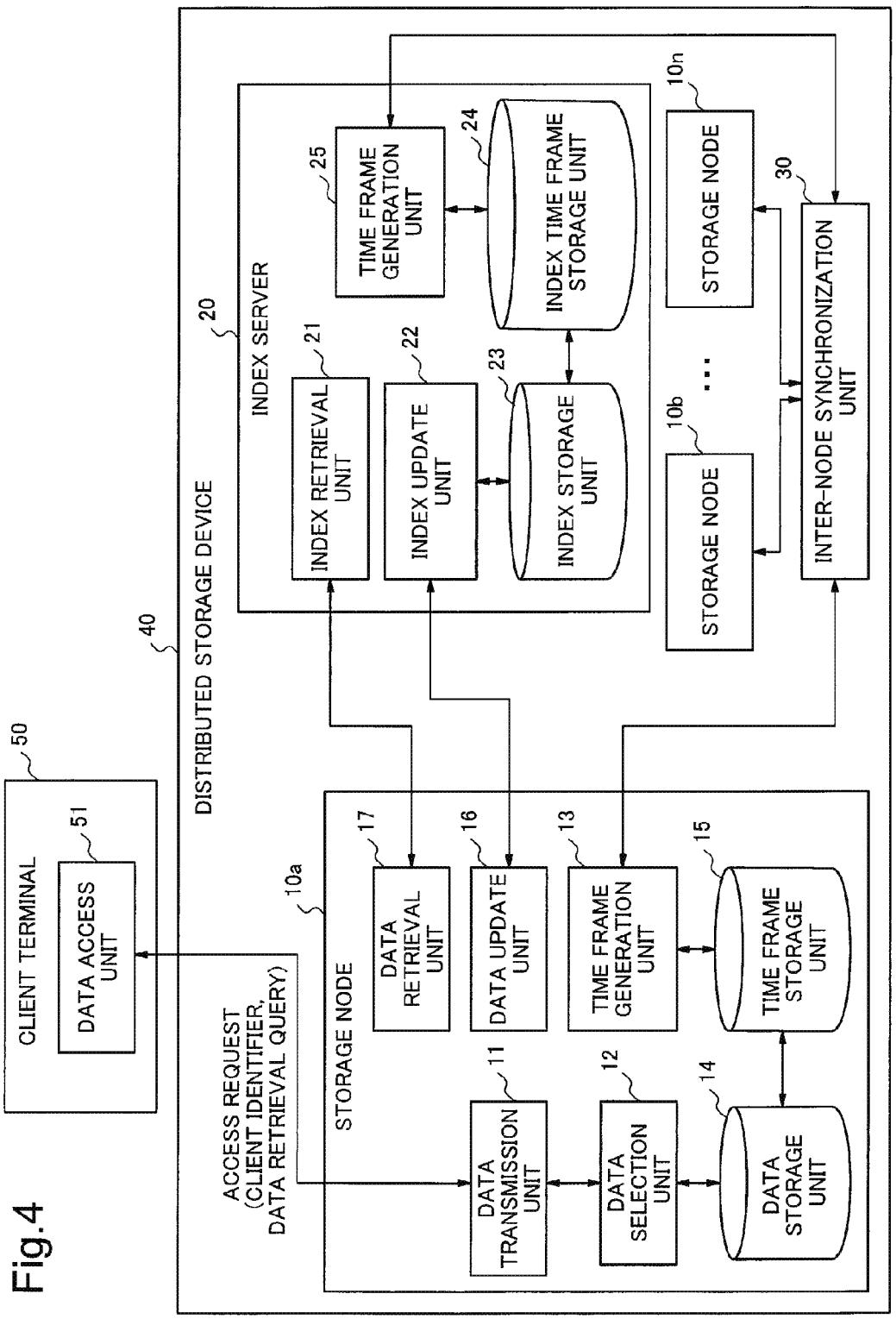
FIG. 4 a block diagram illustrating a structure of a distributed storage device according to a second exemplary embodiment as an example.

Referring to FIG. 4, the distributed storage device (40) preferably further includes an index server (20). The index server (20) includes an index storage unit (23) that accumulates an index with respect to the stream data accumulated in a data storage unit (14) of each of the plurality of storage nodes (10a to 10n), a time frame generation unit (25) that generates time frames synchronized with the plurality of storage nodes (10a to 10n) and associates the index accumulated in the index storage unit (23) with one of the time frames, and an index retrieval unit (21) that selects an index associated with a predetermined time frame from the indexes accumulated in the index storage unit (23), based on an access request transferred from any of the plurality of storage nodes (10a to 10n), and transmits the selected index to the one of the storage nodes.

Figure 6:
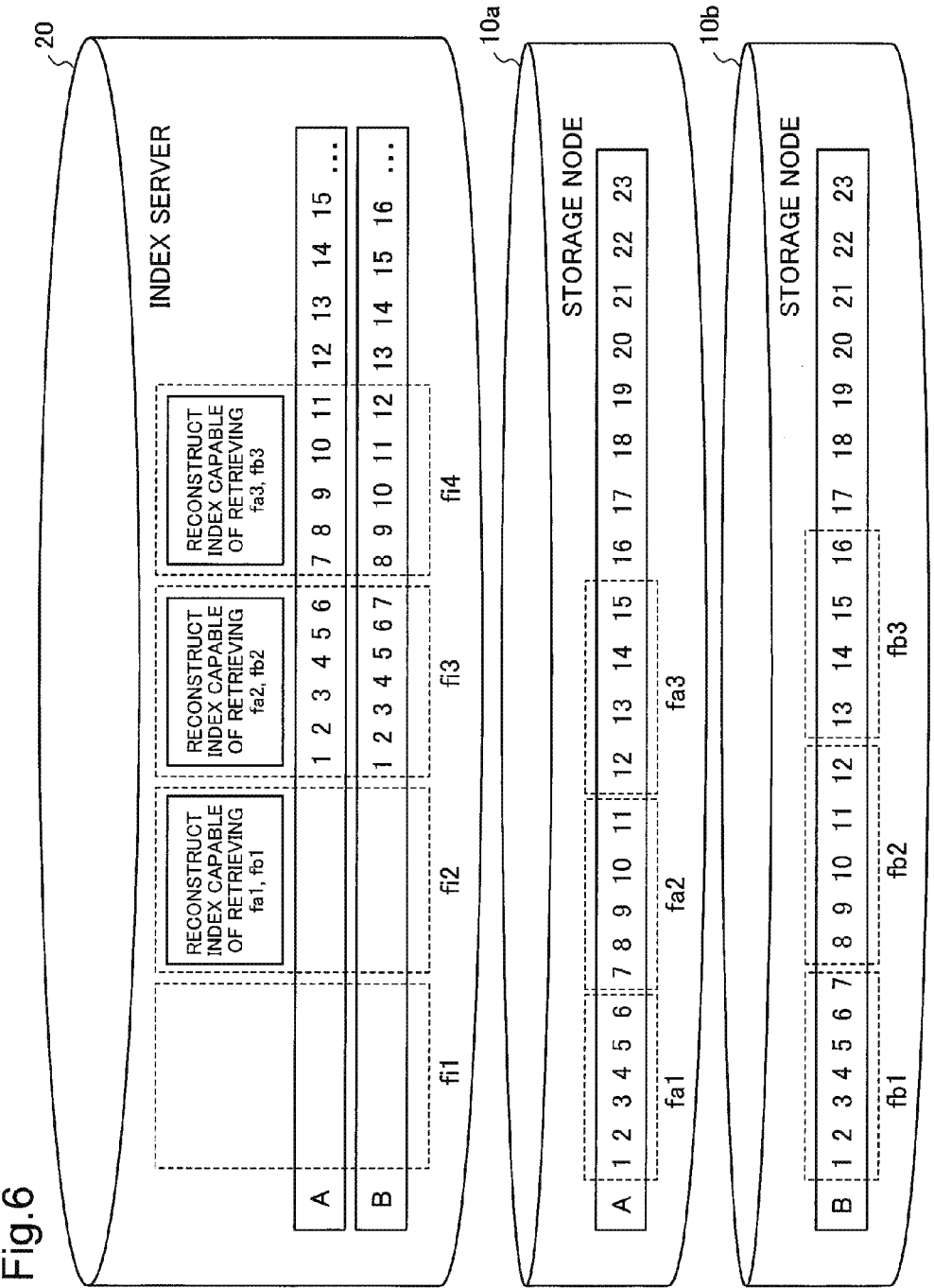
FIG. 6 a diagram exemplifying a relationship between stream data and indexes accumulated in each storage node and the index server of the distributed storage device according to the second exemplary embodiment, and time frames.
Figure 7:
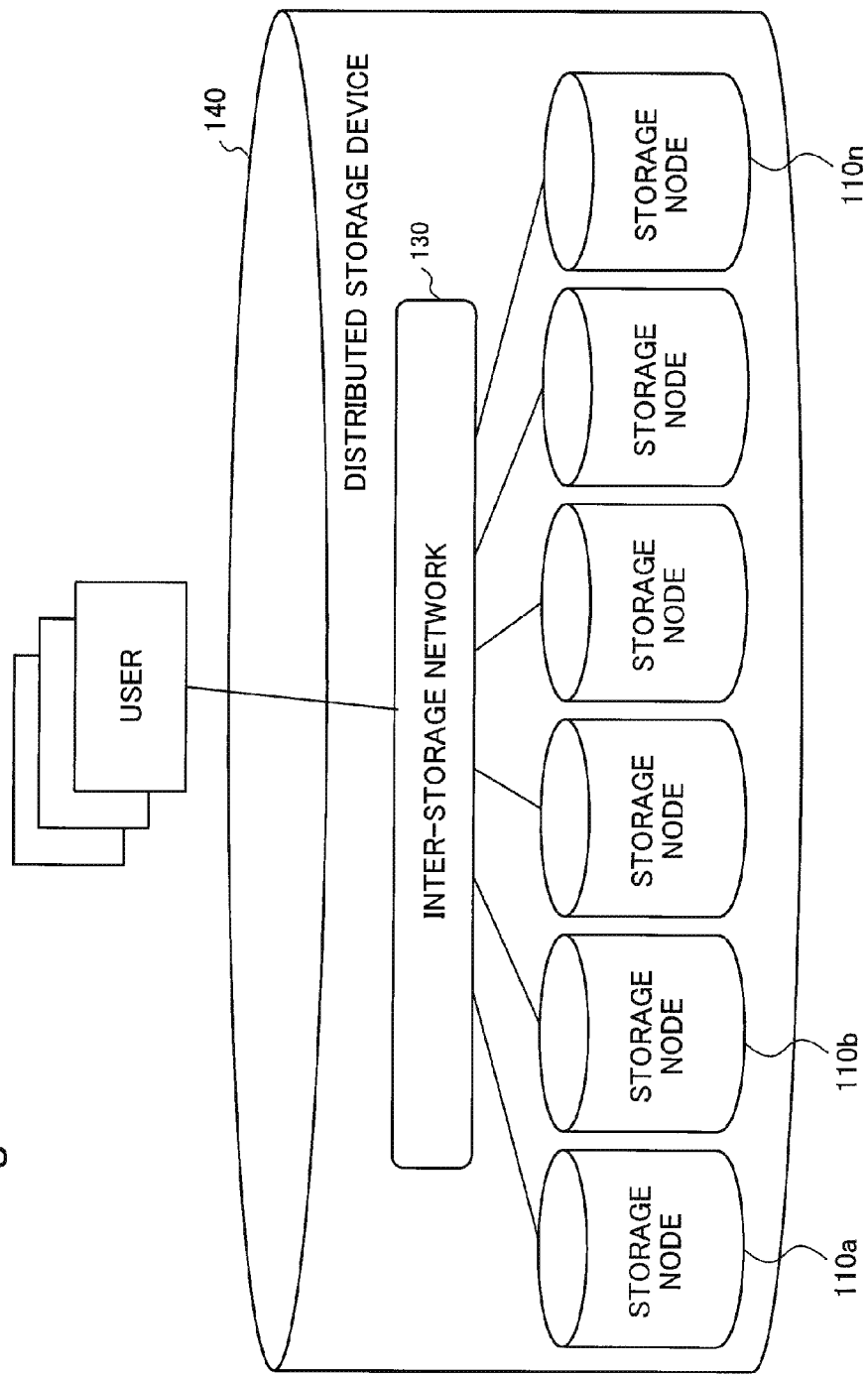
FIG. 7 a diagram illustrating a structure of a distributed storage device as an example.
Figure 8:
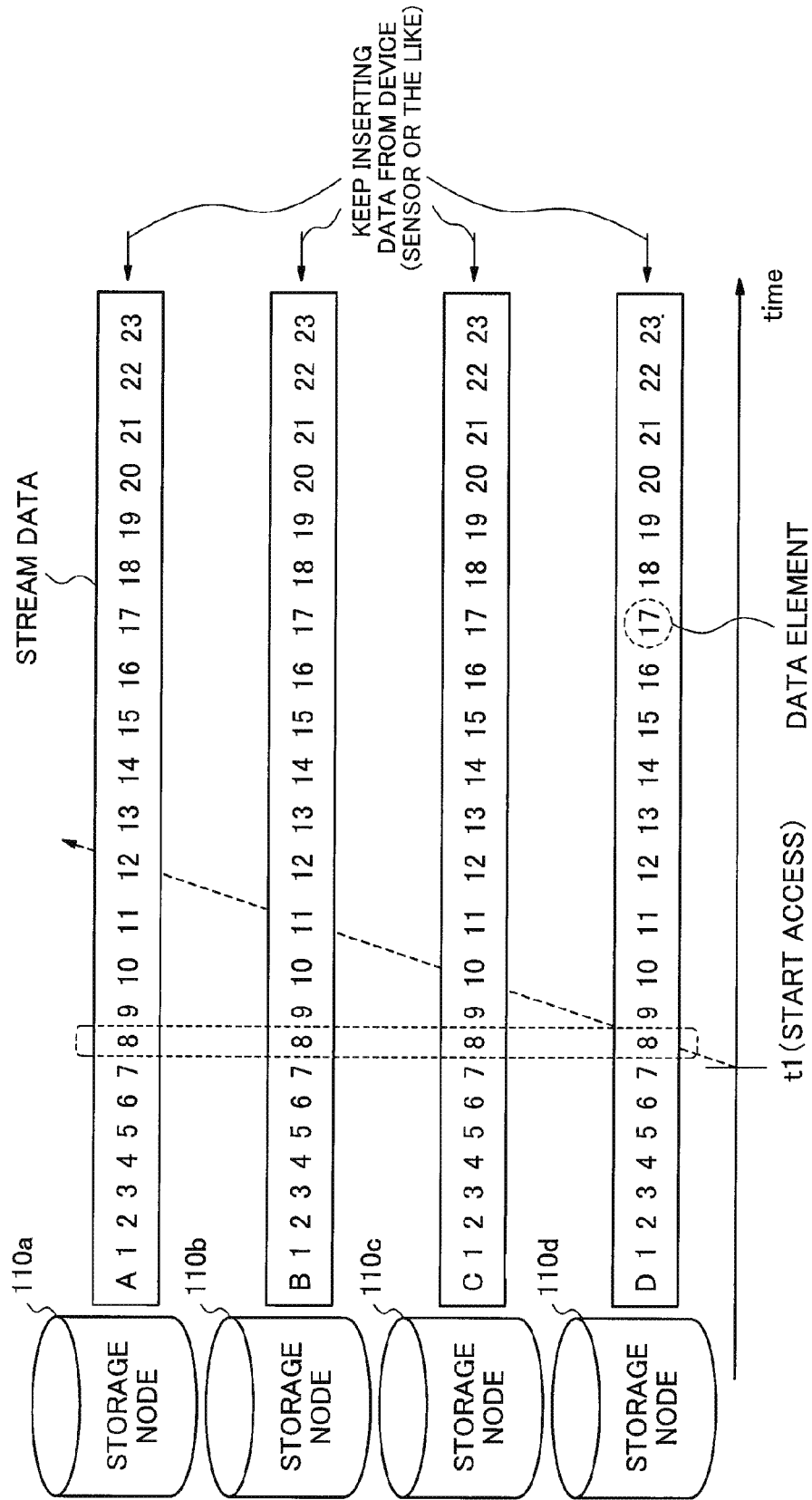
FIG. 8 a diagram for illustrating a problem when accessing using a primary key in a distributed storage device according to a related art.
Figure 9:
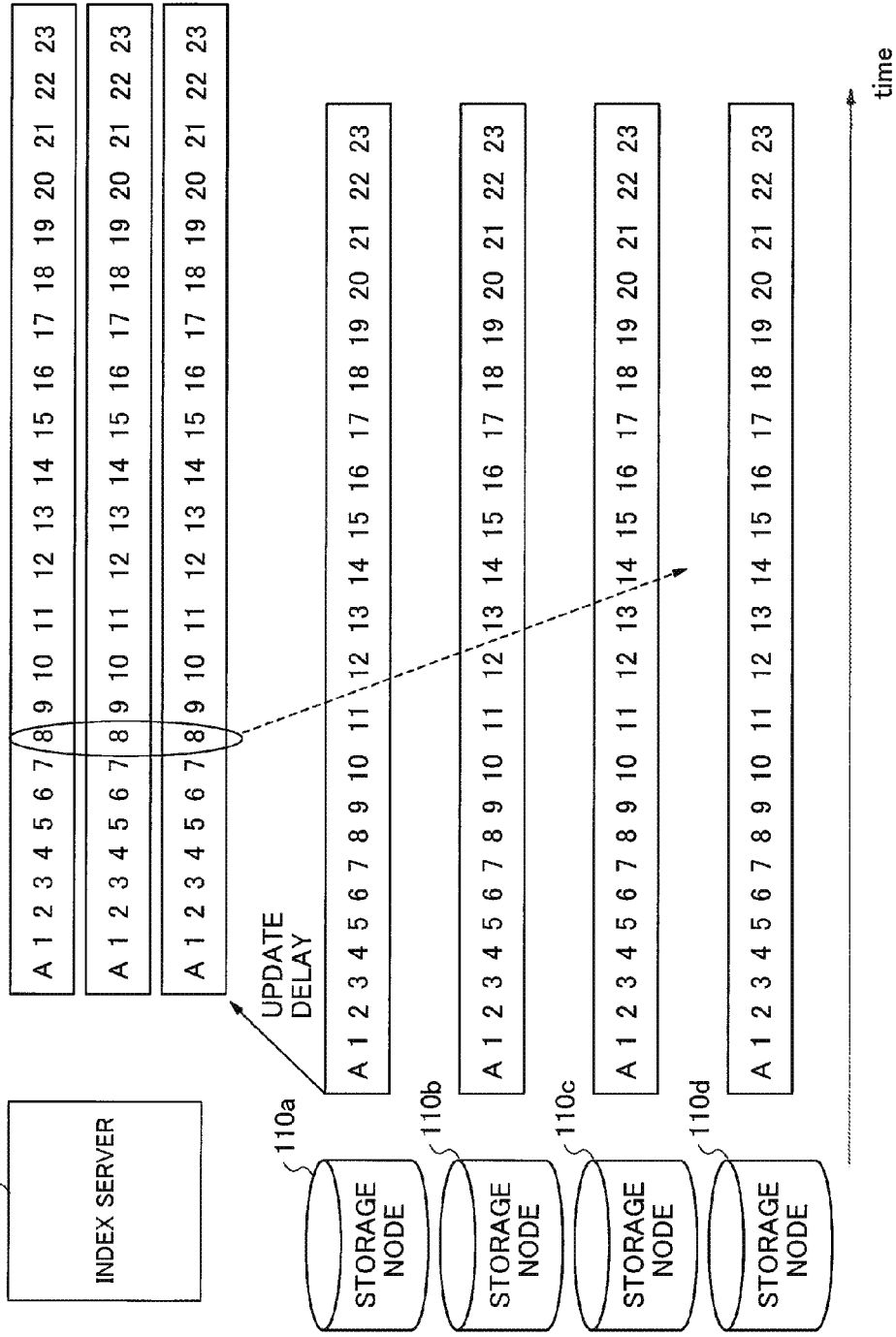
FIG. 9 a diagram for illustrating a problem when accessing using metadata in the distributed storage device according to the related art.

Referring to FIG. 6, the index storage unit (23) of the index server (20) is updated after new data reaches the storage nodes (10a to 10n). At this time, a time frame difference between a time frame (for example, fa1 and fb1 in FIG. 6) in which data reaches the storage nodes and a time frame (fi3) in which the data can be retrieved in the index server is designed to be constant (2 in FIG. 6).

Figure 5:
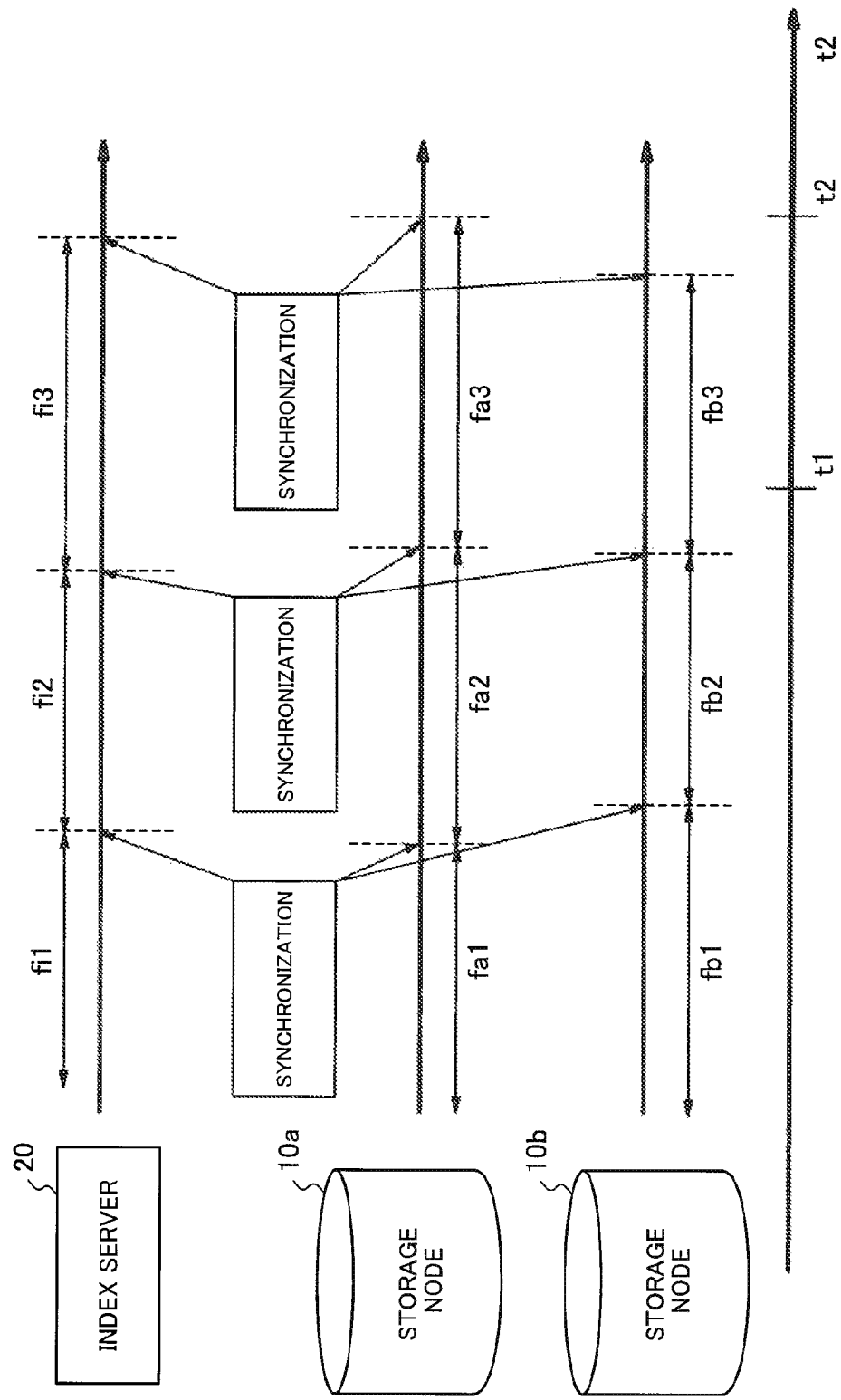
FIG. 5 a diagram illustrating a behavior of each storage node and an index server of the distributed storage device according to the second exemplary embodiment to generate time frames as an example.

For example, in FIG. 5, sets of logically-synchronized time frames (fa1, fb1, fi1), (fa2, fb2, fi2), and (fa3, fb3, fi3) can be obtained. Further, in FIG. 6, a time frame (fi3) in the index server (20) corresponds to time frames (fa1 and fb1) in the storage nodes (10a and 10b) that are shifted by two time frames.

Further, each of the plurality of storage nodes (10a to 10n) further includes a data update unit (16) that transmits the stream data accumulated in the data storage unit (14) to the index server (20), and a data retrieval unit (17) that transfers an access request from the client terminal (50) to the index retrieval unit (21).

The data selection unit (12) selects a data element (for example, A6 in FIG. 6) associated with a time frame (fa1 in FIG. 6) on the own storage node (10a) corresponding to a time frame (fi3 in FIG. 6) on the index server (20) associated with indexes (for example, indexes with respect to data elements A1 to A6, and B1 to B7 in FIG. 6) selected by the index retrieval unit (21) with respect to the access request from the client terminal (50) transferred to the index server (20), as a data element with respect to a subsequent access request from the client terminal (50). Further, the data selection unit (not depicted) of the storage node (10b) selects a data element (for example, B7 in FIG. 6) associated with a time frame (fb1 in FIG. 6) on the own storage node (10b) corresponding to a time frame (fi3 in FIG. 6) on the index server (20) associated with the indexes (indexes with respect to data elements A1 to A6, and B1 to B7 in FIG. 6) selected by the index retrieval unit (21) with respect to the access request from the client terminal (50) transferred to the index server (20) by another storage node (for example, 10a), as a data element with respect to a subsequent access request from the client terminal (50).

According to the distributed storage device (40), consistent data elements and indexes (for example, data elements A6 and B7 in FIG. 6, and indexes of data elements A1 to A6, and B1 to B7) can be obtained from each of the plurality of storage nodes (10a to 10n) that distribute and accumulate the stream data transmitted from the device and the index server (20) that accumulates the indexes with respect to the stream data accumulated in the storage nodes (10a to 10n).

Exemplary Embodiment 1

A distributed storage device according to a first exemplary embodiment will be described in details with reference to the drawings. FIG. 1 is a block diagram illustrating a structure of the distributed storage device according to the present exemplary embodiment as an example. Referring to FIG. 1, a distributed storage device 40 includes a plurality of storage nodes 10a to 10n. Further, the distributed storage device 40 may include an inter-node synchronization unit 30. Each of the storage nodes 10a to 10n includes a data transmission unit 11, a data selection unit 12, a time frame generation unit 13, a data storage unit 14, and a time frame storage unit 15. It is noted that, in FIG. 1, constituents of only the storage node 10a are illustrated. Illustration for storage nodes 10b to 10n is omitted because of having the same structure as the storage node 10a.

A client terminal 50 obtains desired data from the distributed storage device 40 using a data access unit 51.

The data access unit 51 transmits a client identifier and an access request including a data key (primary key) indicating desired stream data to the distributed storage device 40, and obtains a data element included in corresponding stream data.

The data transmission unit 11 receives the access request from the data access unit 51, identifies data to be transmitted using the data selection unit 12, takes out an appropriate data element from the stream data, and sends the data element to the data access unit 51.

The data selection unit 12 identifies a time frame to be responded to an appropriate client based on the client identifier, and selects which data element should be transmitted depending on the data key and the time frame. In a case of initial access from the client terminal 50, the time frame to be responded may be a k-th (a predetermined number, for example, 1) time frame before the latest time frame. Further, a data element to be transmitted may be a predetermined (for example, latest) data element included in the stream data in the time frame.

The time frame generation unit 13 generates time frames synchronized between the plurality of storage nodes 10a to 10n. The time frame generation unit 13 may use the inter-node synchronization unit 30 so as to generate a time frame synchronized with a time frame generated by another storage node. The time frame generation unit 13 updates consistent time frames between the plurality of storage nodes, and associates each of the stored data elements with one of the time frames. The time frame generation unit 13 may store "time frame information" indicating the association in the time frame storage unit 15.

The data storage unit 14 accumulates stream data generated by a sensor or the like.

The time frame storage unit 15 stores information indicating which time frame each of the data elements included in the stream data accumulated in the data storage unit 14 is associated with, as "time frame information".

The inter-node synchronization unit 30 generates a request for updating a time frame so as to generate consistent time frames between the plurality of storage nodes 10a to 10n. It is noted that the inter-node synchronization unit 30 may update a time frame by performing communication using distributed synchronization algorithm and distributed consensus algorithm (for example, PAXOS and the like) that are existing technologies. Further, a clock having sufficiently-high accuracy, such as an atomic clock, may be provided in each of the storage nodes 10a to 10n, and a time frame may be determined by each storage node without performing communication. Further, the inter-node synchronization unit 30 may be included in each of the storage nodes 10a to 10n, or may be realized as a separate calculator.

Figure 2:
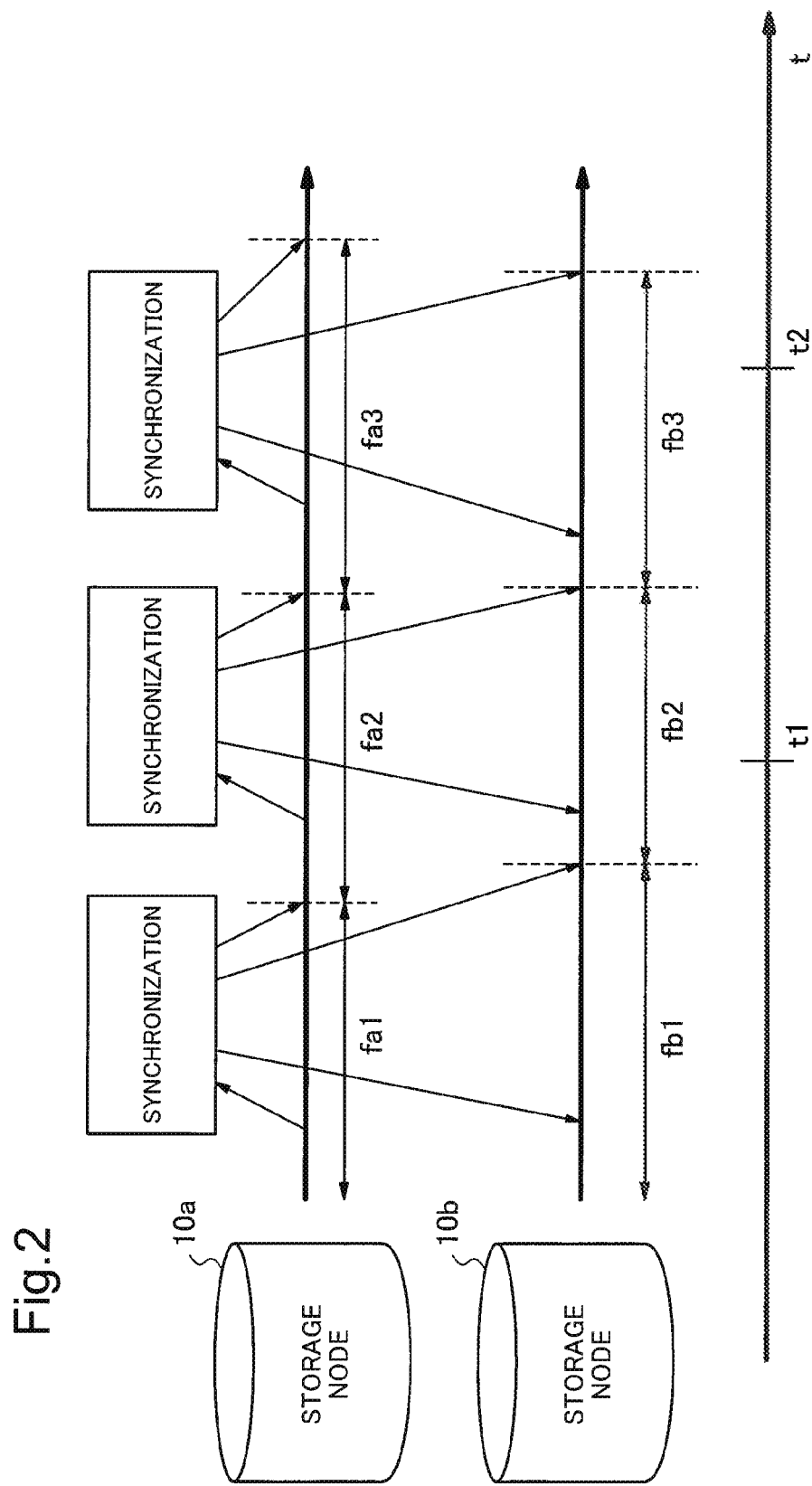
FIG. 2 a diagram illustrating a behavior of each storage node of the distributed storage device according to the first exemplary embodiment to generate time frames as an example.
Figure 3:
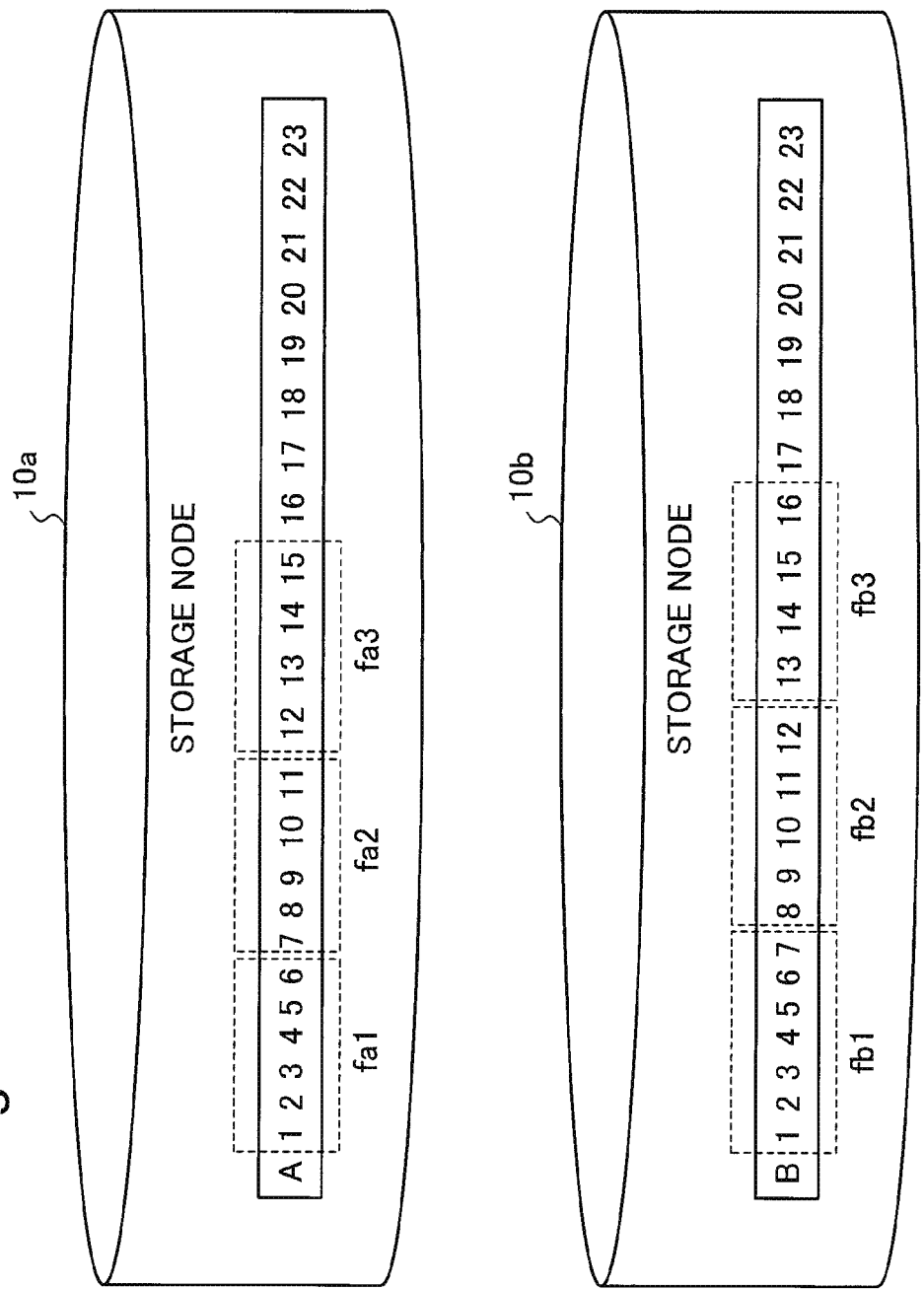
FIG. 3 a diagram exemplifying a relationship between stream data accumulated in each storage node of the distributed storage device according to the first exemplary embodiment and time frames.

FIGS. 2 and 3 are diagrams illustrating a behavior of the distributed storage device (FIG. 1) according to the present exemplary embodiment as an example. FIG. 2 is a diagram illustrating a behavior of each storage node of the distributed storage device 40 to generate time frames as an example. On the other hand, FIG. 3 is a diagram exemplifying a relationship between stream data accumulated in each storage node of the distributed storage device and time frames. It is noted that, in the present exemplary embodiment, in place of performing perfect synchronization between the storage nodes 10a and 10b, synchronization is performed between the storage nodes 10a and 10b on a discrete-time basis, and versioning is performed.

Referring to FIGS. 2 and 3, the distributed storage device 40 includes two storage nodes 10a and 10b. Each of the storage nodes 10a and 10b accumulates stream data output from a device (for example, a sensor). The storage node 10a accumulates stream data A consisting of data elements A1, A2, . . . . Similarly, the storage node 10b accumulates stream data B consisting of data elements B1, B2, . . . .

Each of the storage nodes 10a and 10b generates time frames (at least logically) synchronized with another storage node, and associates each data element included in the accumulated stream data with one of the time frames. In FIG. 2, the storage node 10a generates time frames fa1 to fa3. On the other hand, the storage node 10b generates time frames fb1 to fb3. At this time, the time frames fa1 and fb1, the time frames fa2 and fb2, and the time frames fa3 and fb3 are respectively synchronized between the storage nodes 10a and 10b.

Referring to FIG. 3, as an example, the storage node 10a associates data elements A1 to A6, data elements A7 to A11, and data elements A12 to A15 among data elements included in the stream data A with the time frames fa1, fa2, and fa3, respectively. On the other hand, the storage node 10b associates data elements B1 to B7, data elements B8 to B12, and data elements B13 to B16 among data elements included in the stream data B with the time frames fb1, fb2, and fb3, respectively.

Herein, the client terminal 50 is assumed to access the storage node 10a at a time t1. At this time, the storage node 10a selects a data element associated with a predetermined time frame in the accumulated stream data A. As an example, the storage node 10a may select a data element associated with a time frame by a predetermined number before the time frame on receiving the access request from the client terminal 50. Further, the storage node 10a may select the latest data element included in the time frame. For example, when the predetermined number is 1, the storage node 10a selects the latest data element A6 among the data elements associated with the time frame fa1. Furthermore, the storage node 10a transmits the selected data element A6 to the client terminal 50.

Next, the same client terminal 50 is assumed to access the storage node 10b at a time t2. At this time, the storage node 10b selects a data element associated with a time frame synchronized with the time frame fa1 associated with the data element A6 selected by the storage node 10a (that is, the time frame fb1) with respect to the access request from the client terminal 50, as a data element with respect to the access request from the client terminal 50. Further, the storage node 10b may select the latest data element included in the time frame fb1. At this time, the storage node 10b selects a data element B7 and transmits the selected data element B7 to the client terminal 50.

According to the distributed storage device, synchronized data elements (in the above-described example, data elements A6 and B7) can be obtained from each of the plurality of storage nodes that distribute and accumulate the stream data transmitted from the device.

Further, a client terminal 50b (not depicted) different from the client terminal 50 is assumed to access the storage node 10b at the time t2. At this time, the storage node 10b selects a data element associated with the time frame fb2 with respect to the access request from the client terminal 50b, as a data element with respect to the access request from the client terminal 50b. Further, the storage node 10b may select the latest data element included in the time frame fb2. At this time, the storage node 10b selects a data element B7 and transmits the selected data element B7 to the client terminal 50b.

According to the distributed storage device, synchronized data elements (in the above-described example, data elements A6 and B7) can be obtained from each of the plurality of storage nodes that distribute and accumulate the stream data transmitted from the device.

Exemplary Embodiment 2

A distributed storage device according to a second exemplary embodiment will be described in details with reference to the drawings. FIG. 4 is a block diagram illustrating a structure of the distributed storage device according to the present exemplary embodiment as an example. Referring to FIG. 4, a distributed storage device 40 includes a plurality of storage nodes 10a to 10n and an index server 20. Further, the distributed storage device 40 may include an inter-node synchronization unit 30.

In the same way as the storage nodes in the distributed storage device (FIG. 1) according to the first exemplary embodiment, each of the storage nodes 10a to 10n includes a data transmission unit 11, a data selection unit 12, a time frame generation unit 13, a data storage unit 14, and a time frame storage unit 15. Furthermore, the storage nodes 10a to 10n include a data update unit 16 and a data retrieval unit 17.

The index server 20 includes an index retrieval unit 21, an index update unit 22, an index storage unit 23, an index time frame storage unit 24, and a time frame generation unit 25.

The data update unit 16 receives data from a device that transmits stream data obtained by a sensor or the like to the distributed storage device 40. Then, the data update unit 16 stores the stream data in the data storage unit 14 of the storage node, and transfers the data to the index update unit 22 of the index server 20.

The data retrieval unit 17 receives an access request including a data retrieval query from a data access unit 51 of a client terminal 50. The data retrieval unit 17 transfers the access request to the index server 20, and obtains information indicating appropriate data. The information indicating appropriate data may be a list of a primary key, for example. Further, the information indicating appropriate data may be a combination of an address indicating a certain storage region of a storage device storing the data and a size of the region. However, the information indicating appropriate data is not limited thereto.

The index server 20 retrieves appropriate data from a query and issuing client information in accordance with contents of the data with respect to stored data in the distributed storage device 40. The index server 20 may be implemented on any storage node included in the distributed storage device 40, or may be realized by distributed coordination of the plurality of storage nodes. Further, the index server 20 may be realized by separate one or more calculators.

The index retrieval unit 21 generates information corresponding to the data retrieval query and indicating data to be returned to the client terminal 50, based on index data and index time frame information, and responds to the data retrieval unit 17. In a case of initial access from the client terminal 50, the data to be returned may be n-th (a predetermined number) previous time frame information which meets the query. On the other hand, in a case of second or later access, the data to be returned may be time frame information corresponding to the client terminal 50, which meets the query.

The index update unit 22 registers the index data into the index storage unit 23 so as to be able to retrieve the data obtained from the data update unit 16 at high speed. The index update unit 22 is updated after new data reaches the storage nodes. At this time, the number of time frames between a time frame f1 in which data reaches the storage nodes and a time frame f2 in which the data can be retrieved by the index server is designed to be constant. As an example, reconstruction of indexes for all data can be designed to be completed within three time frames. Further, as another example, at least two indexes, an index that stores only lately updated data and an index for previous data, can be formed and a configuration in which the nearest data is searched by scanning these indexes in parallel can be used so that the latest data can be retrieved in less and assured time. Furthermore, only lately updated data can be retrieved by total scanning without forming an index, and on the other hand, only old data can be retrieved by an index so that the latest data can be retrieved in less and assured time. It is noted that the data structure is not limited thereto.

Herein, the index data maintains data with a data structure capable of processing the query at high speed. For example, a data structure such as B+-tree, hash table, R-tree, bit map index, and Trie can be used. However, the data structure of the index data is not limited thereto.

The index time frame storage unit 24 maintains the index time frame information. Herein, the index time frame information is information indicating which time frame each of the stored "index data" is associated with. Further, the index time frame storage unit 24 may further include information indicating which time frame of the storage server the time frame of the index server is associated with.

The time frame generation unit 25 updates time frames depending on a consistent time frame updating request between the plurality of storage nodes 10*a* to 10*n* by using the inter-node synchronization unit 30, and updates "index time frame information" indicating which time frame each of the stored "data" is associated with.

FIGS. 5 and 6 are diagrams illustrating a behavior of the distributed storage device (FIG. 4) according to the present exemplary embodiment as an example. FIG. 5 is a diagram illustrating a behavior of each storage node of the distributed storage device 40 to generate time frames as an example. On the other hand, FIG. 6 is a diagram exemplifying a relationship between stream data accumulated in each storage node of the distributed storage device and time frames. In the present exemplary embodiment, in the same way as the first exemplary embodiment, synchronization is performed between the storage nodes 10*a* and 10*b* on a discrete-time basis, and versioning is performed. Further, the index server 20 generates indexes with respect to stream data A and B accumulated in the storage nodes 10*a* and 10*b*.

Referring to FIG. 5, the distributed storage device 40 includes two storage nodes 10*a* and 10*b*. Each of the storage nodes 10*a* and 10*b* accumulates stream data output from a device (for example, a sensor). The storage node 10*a* accumulates stream data A including data elements A1, A2, . . . . On the other hand, the storage node 10*b* accumulates stream data B including data elements B1, B2, . . . . The index server 20 generates and maintains indexes with respect to the stream data accumulated in the storage nodes 10*a* and 10*b*.

Each of the storage nodes 10*a*, 10*b*, and the index server 20 generates time frames synchronized with other nodes, and associates each data element included in the accumulated stream data with one of the time frames. In FIG. 5, the storage node 10*a* generates time frames fa1 to fa3. On the other hand, the storage node 10*b* generates time frames fb1 to fb3. Further, the index server 20 generates time frames fi1 to fi3. At this time, the time frames fa1, fb1, and fi1, the time frames fa2, fb2, and fi2, and the time frames fa3, fb3, and fi3 are respectively (at least logically) synchronized between the storage nodes 10*a*, 10*b*, and the index server 20.

Referring to FIG. 6, as an example, the storage node 10*a* associates data elements A1 to A6, data elements A7 to A11, and data elements A12 to A15 among data elements included in the stream data A with the time frames fa1, fa2, and fa3, respectively. On the other hand, the storage node 10*b* associates data elements B1 to B7, data elements B8 to B12, and data elements B13 to B16 among data elements included in the stream data B with the time frames fb1, fb2, and fb3, respectively. Further, the index server 20 constructs indexes with respect to the data elements A1 to A6 and B1 to B7 associated with the time frames fa1 and fb2 in the time frame fi2, and causes the constructed indexes to be referable in and after the time frame fi3. At this time, the time frame fi3 on the index server 20 corresponds to the time frames fa1 and fb1. In this case, the time frames that correspond to each other between the index server 20, and the storage nodes 10*a* and 10*b* are shifted by two time frames. It is noted that the shift of the number of time frames is not limited to two.

Herein, it is assumed that the client terminal 50 transmits an access request including a data retrieval query to the storage node 10*a*, and the storage node 10*a* transfers the access request to the index server 20 at a time t1. The index server 20 selects index data associated with a predetermined time frame. As an example, the index server 20 may select index data associated with a time frame by a predetermined number before the time frame on receiving the access request from the client terminal 50. For example, when the predetermined number is 0, the index server 20 selects index data associated with the time frame fi3 (that is, index data with respect to data elements A1 to A6 and B1 to B7). Furthermore, the index server 20 transmits the selected index data to the client terminal 50 via the storage node 10*a*.

Next, it is assumed that the same client terminal 50 accesses the storage node 10*a* at a time t2. At this time, the storage node 10*a* selects a data element associated with a time frame fa1 on the own storage node 10*a* corresponding to the time frame fi3 on the index server 20 associated with the index data selected by the index server 20 with respect to a access request from the client terminal 50, as a data element with respect to the access request from the client terminal 50. Herein, the storage node 10*a* may select the latest data element included in the time frame fa1. At this time, the storage node 10*a* selects a data element A6 and transmits the selected data element A6 to the client terminal 50.

According to the distributed storage device, consistent data elements and indexes can be obtained from each of the plurality of storage nodes that distribute and accumulate the stream data transmitted from the device and the index server that accumulates the indexes with respect to the stream data accumulated in the storage nodes.

It is noted that, in the above-described exemplary embodiments, a plurality of components may further include means for forbidding updating stream data having the same identifier at the same time. For example, by only insertion or reserving insertion of sensor data having a certain identifier (ID) in a system in advance, a new client is prevented from inserting data with the same ID.

Further, in the above-described exemplary embodiments, a query for obtaining a predetermined (for example, latest) data element included in a predetermined time frame from a plurality of storage nodes is taken into account. However, a query for incremental processing may be added besides the query. In the incremental processing, a case that a client terminal using data accesses the distributed storage device 40 several times to obtain a series of data elements from the data element obtained at the previous access to the latest data element is considered. As an example, in the distributed storage device 40, it is possible to return a data element required in the incremental processing to the client terminal 50 by maintaining an identifier for each client terminal 50 and information indicating which time frame is read out.

Further, in the above-described exemplary embodiments, a case that the respective storage nodes store separate data is taken into account. However, in order to prevent loss of the stored data in the case of a storage node failure, a structure in which two or more storage nodes store the same data may be used. Moreover, in this case, one of a plurality of storage nodes that maintain certain data may be defined as a primary node for the data, and time frame information associated with the data in the primary node may be used by being stored in another node.

For the present invention, the following embodiments are possible.

Embodiment 1

A distributed storage device is provided, the distributed storage device includes:

a plurality of storage nodes, the plurality of storage nodes includes:

a data storage unit that accumulates stream data output from a device;

a first time frame generation unit that generates a time frame synchronized with another storage node and associates a data element included in stream data accumulated in the data storage unit with one of time frames;

a data selection unit that selects a data element associated with a predetermined time frame from the stream data accumulated in the data storage unit, based on an access request from a client terminal; and a data transmission unit that transmits a data element selected by the data selection unit to the client terminal.

Embodiment 2

The data selection unit may select a data element associated with a time frame associated with the selected data element, as a data element with respect to a subsequent access request from the client terminal.

Embodiment 3

The data selection unit may select a data element associated with a time frame synchronized with a time frame associated with a data element selected by another storage node with respect to an access request from the client terminal, as a data element with respect to a subsequent access request from the client terminal.

Embodiment 4

The data selection unit may select a data element associated with a time frame by a predetermined number before a time frame on receiving an access request from the client terminal.

Embodiment 5

The data selection unit may select a latest data element included in the predetermined time frame.

Embodiment 6

The access request may include an identifier that identifies the client terminal.

Embodiment 7

The distributed storage device may include an inter-node synchronization unit that generates a request for updating a time frame, and the first time frame generation unit may generate a time frame depending on a request generated by the inter-node synchronization unit.

Embodiment 8

The distributed storage device may further include:

the index server includes:

an index storage unit that accumulates an index with respect to stream data accumulated in a data storage unit of the plurality of storage nodes;

a second time frame generation unit that generates a time frame synchronized with the plurality of storage nodes and associates an index accumulated in the index storage unit with one of time frames; and an index retrieval unit that selects an index associated with a predetermined time frame from indexes accumulated in the index storage unit, based on the access request transferred from one of storage nodes of the plurality of storage nodes, and transmits a selected index to the one of storage nodes, wherein the plurality of storage nodes may further include:

a data update unit that transmits stream data accumulated in the data storage unit to the index server; and a data retrieval unit that transfers an access request from a client terminal to the index retrieval unit.

Embodiment 9

The data selection unit may select a data element associated with a time frame on an own storage node corresponding to a time frame on the index server associated with an index selected by the index retrieval unit with respect to an access request from a client terminal transferred to the index server, as a data element with respect to a subsequent access request from the client terminal.

Embodiment 10

The data selection unit may select a data element associated with a time frame on an own storage node corresponding to a time frame on the index server associated with an index selected by the index retrieval unit with respect to an access request from a client terminal transferred to the index server by another storage node, as a data element with respect to a subsequent access request from the client terminal.

Embodiment 11

A data providing method is provided, the method includes:

accumulating stream data output from a device in a data storage unit by a storage node that is one of a plurality of storage nodes included in a distributed storage device;

generating a time frame synchronized with another storage node and associating a data element included in stream data accumulated in the data storage unit with one of time frames;

selecting a data element associated with a predetermined time frame from the stream data accumulated in the data storage unit, based on an access request from a client terminal; and transmitting a selected data element to the client terminal.

Embodiment 12

In the data providing method, the storage node may select a data element associated with a time frame associated with the selected data element, as a data element with respect to a subsequent access request from the client terminal.

Embodiment 13

In the data providing method, the storage node may select a data element associated with a time frame synchronized with a time frame associated with a data element selected by another storage node with respect to an access request from the client terminal, as a data element with respect to a subsequent access request from the client terminal.

Embodiment 14

The data providing method may include:

transmitting stream data accumulated in the data storage unit to an index server by the storage node;

transferring an access request from the client terminal to the index server;

accumulating an index with respect to stream data accumulated in a storage unit of the plurality of storage nodes in an index storage unit by the index server;

generating a time frame synchronized with the plurality of storage nodes and associating an index accumulated in the index storage unit with one of time frames; and selecting an index associated with a predetermined time frame from indexes accumulated in the index storage unit, based on an access request from the client terminal transferred from one of storage nodes of the plurality of storage nodes, and transmitting a selected index to the one of storage nodes.

Embodiment 15

In the data providing method, the storage node may select a data element associated with a time frame on an own storage node corresponding to a time frame on the index server associated with an index selected by the index server with respect to an access request from the client terminal transferred to the index server, as a data element with respect to a subsequent access request from the client terminal.

Embodiment 16

In the data providing method, the storage node may select a data element associated with a time frame on the storage node corresponding to a time frame on the index server associated with an index selected by the index server with respect to an access request from the client terminal transferred to the index server by another storage node, as a data element with respect to a subsequent access request from the client terminal.

Embodiment 17

A computer readable non-transitory medium embodying a program, the program causing a storage node included in a distributed storage device to perform a method, the method includes:

accumulating stream data output from a device in a data storage unit;

generating a time frame synchronized with another storage node and associating a data element included in stream data accumulated in the data storage unit with one of time frames;

selecting a data element associated with a predetermined time frame from the stream data accumulated in the data storage unit, based on an access request from a client terminal; and transmitting a selected data element to the client terminal.

Embodiment 18

The program method may causes the computer to execute processing of include selecting a data element associated with a time frame associated with the selected data element, as a data element with respect to a subsequent access request from the client terminal.

Embodiment 19

The method may include selecting a data element associated with a time frame synchronized with a time frame associated with a data element selected by another storage node with respect to an access request from the client terminal, as a data element with respect to a subsequent access request from the client terminal.

It is noted that each disclosure of the above-described Non Patent Literature and the like is incorporated herein by reference. Within the scope of the entire disclosure (including claims) of the present invention, and in addition, based on the basic technical ideas, the exemplary embodiments can be modified and adjusted. Moreover, within the scope of claims of the present invention, various combinations or selections of various disclosed elements (including each element of each claim, each element of each exemplary embodiment, each element of each drawing, and the like) are possible. More specifically, it is apparent that the present invention includes various modifications and amendments that can be made by those skilled in the art according to all disclosure including claims, and the technical ideas. In particular, regarding the value range described herein, any value or small range included in the range should be interpreted as being specifically described even when there is no particular description.

REFERENCE SINGS LIST 10a to 10n Storage node
11 Data transmission unit
12 Data selection unit
13 Time frame generation unit
14 Data storage unit
15 Time frame storage unit
16 Data update unit
17 Data retrieval unit
20, 120 Index server
21 Index retrieval unit
22 Index update unit
23 Index storage unit 24 Index time frame storage unit
25 Time frame generation unit
30 Inter-node synchronization unit
40, 140 Distributed storage device
50 Client terminal
51 Data access unit
110a to 110n Storage node
130 Inter-storage network
fa1 to fa3, fb1 to fb3, fi1 to fi3 Time frame
t1, t2 Time

The invention claimed is:

1. A distributed storage device comprising:
a plurality of storage nodes,
the plurality of storage nodes comprising at least one hardware processor configured to implement:
   a data storage unit configured to accumulate stream data output from a device;
   a first time frame generation unit configured to generate a first time frame synchronized with another storage node and associate a data element included in stream data accumulated in the data storage unit with one of the first time frames;
   a data selection unit configured to select a data element associated with a predetermined first time frame from the stream data accumulated in the data storage unit, based on an access request from a client terminal, and select a data element associated with a time frame synchronized with a time frame associated with a data element selected by another storage node with respect to an access request from the client terminal, as a data element with respect to a subsequent access request from the client terminal;
   a data transmission unit configured to transmit a data element selected by the data selection unit to the client terminal; and
an index server comprising at least one hardware processor configured to implement:
   an index storage unit configured to accumulate an index with respect to stream data accumulated in a data storage unit of the plurality of storage nodes;
   a second time frame generation unit configured to generate a second time frame synchronized with the plurality of storage nodes and associate an index accumulated in the index storage unit with one of the first time frames and one of the second time frames; and
   an index retrieval unit configured to select an index associated with a predetermined first time frame from indexes accumulated in the index storage unit, based on the access request transferred from one of storage nodes of the plurality of storage nodes, and transmit a selected index to the one of storage nodes,
wherein the at least one hardware processor of the plurality of storage nodes is further configured to implement:
   a data update unit configured to transmit stream data accumulated in the data storage unit to the index server; and
   a data retrieval unit configured to transfer an access request from a client terminal to the index retrieval unit, and
wherein a time frame difference between the first time frame and the second time frame which are associated is designed to be constant.

2. The distributed storage device according to claim 1, wherein
the data selection unit is further configured to select a data element associated with a time frame associated with the selected data element, as a data element with respect to a subsequent access request from the client terminal.

3. The distributed storage device according to claim 1, wherein
the data selection unit is further configured to select a data element associated with a time frame by a predetermined number before a time frame on receiving an access request from the client terminal.

4. The distributed storage device according to claim 1, wherein
the data selection unit is further configured to select a latest data element included in the predetermined time frame.

5. The distributed storage device according to claim 1, wherein
the access request includes an identifier that identifies the client terminal.

6. The distributed storage device according to claim 1, comprising:
at least one hardware processor configured to implement an inter-node synchronization unit configured to generate a request for generating a time frame, wherein
the first time frame generation unit is further configured to generate a time frame depending on a request generated by the inter-node synchronization unit.

7. The distributed storage device according to claim 1, wherein
the data selection unit is further configured to select a data element associated with a time frame on an own storage node corresponding to a time frame on the index server associated with an index selected by the index retrieval unit with respect to an access request from a client terminal transferred to the index server, as a data element with respect to a subsequent access request from the client terminal.

8. The distributed storage device according to claim 1, wherein
the data selection unit is further configured to select a data element associated with a time frame on an own storage node corresponding to a time frame on the index server associated with an index selected by the index retrieval unit with respect to an access request from a client terminal transferred to the index server by another storage node, as a data element with respect to a subsequent access request from the client terminal.

9. A storage node that is one of a plurality of storage nodes included in a distributed storage device, comprising at least one hardware processor configured to implement:
   a data storage unit configured to accumulate stream data output from a device;
   an inter-node synchronization unit configured to generate a request for generating a time frame;
   a first time frame generation unit configured to generate a first time frame synchronized with another storage node and associates a data element included in stream data accumulated in the data storage unit with one of the first time frames, and generate a time frame depending on a request generated by the inter-node synchronization unit;
   a data selection unit configured to select a data element associated with a predetermined first time frame from the stream data accumulated in the data storage unit, based on an access request from a client terminal; and a data transmission unit configured to transmit a data element selected by the data selection unit to the client terminal; and an index server comprising at least one hardware processor configured to implement:

an index storage unit configured to accumulate an index with respect to stream data accumulated in a data storage unit of the plurality of storage nodes;

a second time frame generation unit configured to generate a second time frame synchronized with the plurality of storage nodes and associate an index accumulated in the index storage unit with one of the first time frames and one of the second time frames; and an index retrieval unit configured to select an index associated with a predetermined first time frame from indexes accumulated in the index storage unit, based on the access request transferred from one of storage nodes of the plurality of storage nodes, and transmit a selected index to the one of storage nodes, wherein the at least one hardware processor of the storage node is further configured to implement:

a data update unit configured to transmit stream data accumulated in the data storage unit to the index server; and a data retrieval unit configured to transfer an access request from a client terminal to the index retrieval unit, and wherein a time frame difference between the first time frame and the second time frame which are associated is designed to be constant.

10. The storage node according to claim 9, wherein the data selection unit is further configured to select a data element associated with a time frame associated with the selected data element, as a data element with respect to a subsequent access request from the client terminal.

11. The storage node according to claim 9, wherein the data selection unit is further configured to select a data element associated with a time frame synchronized with a time frame associated with a data element selected by another storage node with respect to an access request from the client terminal, as a data element with respect to a subsequent access request from the client terminal.

12. The storage node according to claim 9, wherein the data selection unit is further configured to select a data element associated with a time frame on the storage node corresponding to a time frame on the index server associated with an index selected by the index retrieval unit with respect to an access request from a client terminal transferred to the index server, as a data element with respect to a subsequent access request from the client terminal.

13. The storage node according to claim 9, wherein the data selection unit is further configured to select a data element associated with a time frame on the storage node corresponding to a time frame on the index server associated with an index selected by the index retrieval unit with respect to an access request from a client terminal transferred to the index server by another storage node, as a data element with respect to a subsequent access request from the client terminal.

14. A data providing method comprising:

accumulating stream data output from a device in a data storage unit by a storage node that is one of a plurality of storage nodes included in a distributed storage device;

generating a first time frame synchronized with another storage node and associating a data element included in stream data accumulated in the data storage unit with one of the first time frames;

selecting a data element associated with a predetermined first time frame from the stream data accumulated in the data storage unit, based on an access request from a client terminal;

transmitting a selected data element to the client terminal;

transmitting stream data accumulated in the data storage unit to an index server by the storage node;

transferring an access request from the client terminal to the index server;

accumulating an index with respect to stream data accumulated in a storage unit of the plurality of storage nodes in an index storage unit by the index server;

generating a second time frame synchronized with the plurality of storage nodes and associating an index accumulated in the index storage unit with one of the first time frames and one of the second time frames; and selecting an index associated with a predetermined first time frame from indexes accumulated in the index storage unit, based on an access request from the client terminal transferred from one of storage nodes of the plurality of storage nodes, and transmitting a selected index to the one of storage nodes, wherein a time frame difference between the first time frame and the second time frame which are associated is designed to be constant, and wherein the storage node selects a data element associated with a time frame associated with the selected data element, as a data element with respect to a subsequent access request from the client terminal.

15. The data providing method according to claim 14, wherein the storage node selects a data element associated with a time frame synchronized with a time frame associated with a data element selected by another storage node with respect to an access request from the client terminal, as a data element with respect to a subsequent access request from the client terminal.

16. The data providing method according to claim 14, wherein the storage node selects a data element associated with a time frame on an own storage node corresponding to a time frame on the index server associated with an index selected by the index server with respect to an access request from the client terminal transferred to the index server, as a data element with respect to a subsequent access request from the client terminal.

17. The data providing method according to claim 14, wherein the storage node selects a data element associated with a time frame on the storage node corresponding to a time frame on the index server associated with an index selected by the index server with respect to an access request from the client terminal transferred to the index server by another storage node, as a data element with respect to a subsequent access request from the client terminal.

18. A computer readable non-transitory medium embodying a program, the program causing a storage node included in a distributed storage device to perform a method, the method comprising:
- accumulating stream data output from a device in a data storage unit;
- generating a first time frame synchronized with another storage node and associating a data element included in stream data accumulated in the data storage unit with one of the first time frames;
- selecting a data element associated with a predetermined first time frame from the stream data accumulated in the data storage unit, based on an access request from a client terminal;
- transmitting a selected data element to the client terminal;
- transmitting stream data accumulated in the data storage unit to an index server by the storage node;
- transferring an access request from the client terminal to the index server;
- accumulating an index with respect to stream data accumulated in the storage unit in an index storage unit by the index server;
- generating a second time frame synchronized with the plurality of storage nodes and associating an index accumulated in the index storage unit with one of the first time frames and one of the second time frames;
- selecting an index associated with a predetermined first time frame from indexes accumulated in the index storage unit, based on an access request from the client terminal transferred from one of storage nodes of the plurality of storage nodes, and transmitting a selected index to the one of storage nodes; and
- selecting a data element associated with a time frame associated with the selected data element, as a data element with respect to a subsequent access request from the client terminal,
- wherein a time frame difference between the first time frame and the second time frame which are associated is designed to be constant.

19. The computer readable non-transitory medium according to claim 18, the method further comprising:
- selecting a data element associated with a time frame synchronized with a time frame associated with a data element selected by another storage node with respect to an access request from the client terminal, as a data element with respect to a subsequent access request from the client terminal.

20. A distributed storage device comprising:
a plurality of storage nodes, the plurality of storage nodes comprising:
- a data storage configured to accumulate stream data output from a device;
- a first time frame generator configured to generate a first time frame synchronized with another storage node and associate a data element included in stream data accumulated in the data storage with one of the first time frames;
- a data selector configured to select a data element associated with a predetermined first time frame from the stream data accumulated in the data storage, based on an access request from a client terminal, and select a data element associated with a time frame by a predetermined number before a time frame on receiving an access request from the client terminal; and
- a data transmitter configured to transmit a data element selected by the data selector to the client terminal; and an index server comprising:
- an index storage configured to accumulate an index with respect to stream data accumulated in a data storage of the plurality of storage nodes;
- a second time frame generator configured to generate a second time frame synchronized with the plurality of storage nodes and associate an index accumulated in the index storage with one of the first time frames and one of the second time frames; and
- an index retriever configured to select an index associated with a predetermined first time frame from indexes accumulated in the index storage, based on the access request transferred from one of storage nodes of the plurality of storage nodes, and transmit a selected index to the one of storage nodes, wherein the plurality of storage nodes further comprises:
- a data updater configured to transmit stream data accumulated in the data storage to the index server; and
- a data retriever configured to transfer an access request from a client terminal to the index retriever, and wherein a time frame difference between the first time frame and the second time frame which are associated is designed to be constant.

* * * * *

UNITED STATES PATENT AND TRADEMARK OFFICE
CERTIFICATE OF CORRECTION

PATENT NO. : 9,870,402 B2
APPLICATION NO. : 14/427182
DATED : January 16, 2018
INVENTOR(S) : Dai Kobayashi et al.

It is certified that error appears in the above-identified patent and that said Letters Patent is hereby corrected as shown below:

In the Specification

Column 16, Description of Embodiments, Line 21; Before "method", delete "program"

Column 16, Description of Embodiments, Lines 21-22; After "method may", delete "causes the computer to execute processing of"

Signed and Sealed this
Second Day of April, 2019

Andrei Iancu
*Director of the United States Patent and Trademark Office*